United States Patent [19]
Kutscher et al.

[11] Patent Number: 5,787,370
[45] Date of Patent: Jul. 28, 1998

[54] METHOD AND APPARATUS FOR VEHICLE HEADLIGHT-RANGE ADJUSMENT

[75] Inventors: Eberhard Kutscher, Marbach; Hans Scheerer, Esslingen; Dirk Hamann, Weinstadt, all of Germany

[73] Assignee: Mercedes-Benz Ag, Germany

[21] Appl. No.: 545,116

[22] Filed: Oct. 19, 1995

[30] Foreign Application Priority Data

Oct. 24, 1994 [DE] Germany ............... 44 37 949.8

[51] Int. Cl.⁶ .................................................. B60Q 1/08
[52] U.S. Cl. .................. 701/49; 362/71; 307/10.8
[58] Field of Search .............. 364/424.059, 424.045, 364/424.046, 424.058; 307/10.1, 10.8; 362/61, 68, 71, 72, 285, 286, 428; 280/707, 714; 701/36, 37, 48, 49

[56] References Cited

U.S. PATENT DOCUMENTS

| | | | |
|---|---|---|---|
| 4,204,270 | 5/1980 | D'Orsay | 362/71 |
| 4,223,375 | 9/1980 | Alphen | 362/72 |
| 4,295,660 | 10/1981 | Toti et al. | 280/714 |
| 4,336,571 | 6/1982 | Marchand | 362/68 |
| 4,870,545 | 9/1989 | Hatanaka et al. | 362/72 |
| 5,182,460 | 1/1993 | Hussman | 307/10.8 |
| 5,191,530 | 3/1993 | Hussman et al. | 364/424.059 |
| 5,426,571 | 6/1995 | Jones | 362/72 |

*Primary Examiner*—Gary Chin
*Attorney, Agent, or Firm*—Evenson, McKeown, Edwards & Lenahan, P.L.L.C.

[57] ABSTRACT

A device and a method to detect dynamic changes in the level or ground clearance of a vehicle. The changes are determined indirectly by the instances of longitudinal acceleration of the vehicle which are analogous with these changes, preferably by calculation from signals of rotational speed sensors for the vehicle wheels. Such sensors are normally present in vehicles with anti-lock braking system or traction control systems.

8 Claims, 2 Drawing Sheets

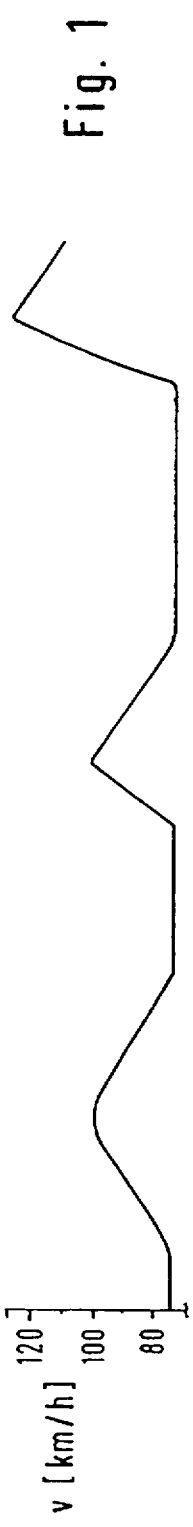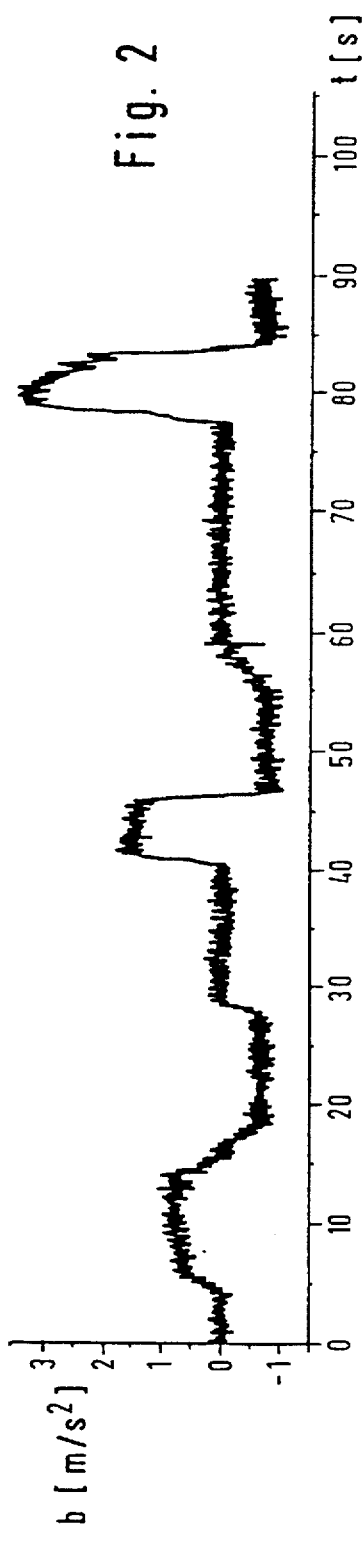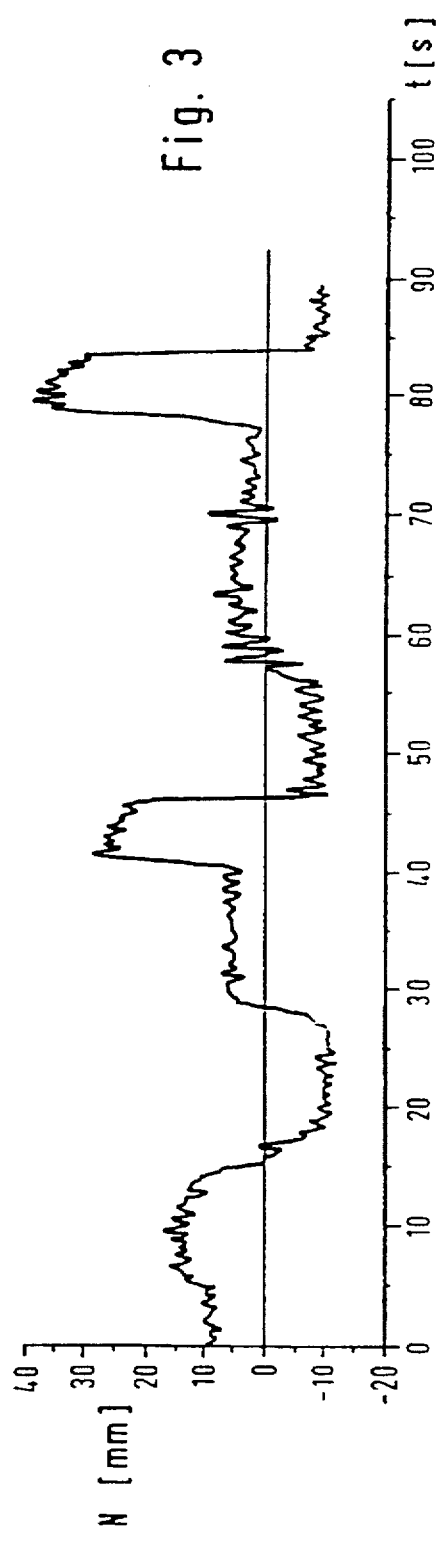

METHOD AND APPARATUS FOR VEHICLE HEADLIGHT-RANGE ADJUSMENT

BACKGROUND AND SUMMARY OF THE INVENTION

The present invention relates to a method and apparatus for headlight-range adjustment on a vehicle. Headlights can be adjusted automatically as a function of the acceleration or deceleration of the vehicle in the longitudinal direction of the vehicle.

DE 30 22 939 A1 describes a device which operates essentially mechanically and has an inertia pendulum whose movements in relation to the vehicle are transmitted to adjustable headlights of the vehicle by a linkage. This arrangement is intended to compensate the changes in the headlight-range setting which otherwise occur as a result of pitching movements of the vehicle during braking and acceleration. This known arrangement is constructed in a way such that a downward gradient or upward gradient of the roadway does not have any major effects on the adjustment of the headlights in relation to the vehicle.

DE-AS 16 80 301 discloses a control device with an inertia element for preventing ride control during the acceleration or deceleration of a vehicle whose suspension is equipped with a hydraulic and/or pneumatic ride control device. As a result, the energy requirement for the ride control can be reduced.

DE 39 17 245 C2 describes a system for compensating position changes of a vehicle which occur when a traction control system (TCS) is used. The pitching movements of a vehicle which occur when a vehicle is accelerating change if the TCS system positively brakes a slipping drive wheel because in such a situation, additional reaction moments which lead to movements of the body of the vehicle to which the driver is unaccustomed occur even if, at the same time, the power of the engine of the vehicle is automatically reduced. This known system is designed to avoid this problem.

U.S. Pat. No. 5,103,396 describes a vehicle with an active suspension system which operates as a function of acceleration. Separate acceleration sensors are provided for determining the longitudinal, lateral and vertical acceleration of the vehicle.

EP 05 45 130 A2 describes derivation of a switching value is derived from signals of anti-lock brake systems (ABS) or of a traction control system (TCS) in order to control the suspension adjustment system during braking or acceleration in order to achieve maximum contact with the roadway.

An object of the present invention is to provide a new headlight-range adjustment system in which a high degree of reliability can be realized with comparatively low constructional complexity.

This object has been achieved according to the present invention in that the vehicle has a device, in particular an anti-lock brake device (ABS) or a traction control system (TCS), which detects the rotational speed of the wheels of the vehicle, signals which are analogous with the longitudinal acceleration or deceleration and thus with dynamic changes in level or ground clearance of the vehicle are determined from the rotational speed signals, and these signals serve to control adjustment elements which are connected in terms of drive to the headlights of the vehicle in order to keep the range setting of the headlights very largely independent of the dynamic changes of the level or ground clearance.

The present invention is based on the determination of the absolute value and direction of the vehicle longitudinal acceleration or deceleration which can be readily accomplished by computational means, i.e. mathematically by way of differentiation or by forming a difference quotient, from the vehicle wheel speeds with traction control. Thus, at the same time experience values for the dynamic changes in the level or ground clearance of the vehicle which are associated with the respectively determined instances of acceleration or deceleration, in particular in the pitching movement of the vehicle occurring during deceleration or acceleration, can be simultaneously specified and used for range control of the headlights.

A particular advantage of the present invention lies in the fact that the signals of vehicle-side systems can be used. These signals are present in any case for the purposes of the vehicle safety and are configured for maximum reliability. As a result, the pitching movements which a vehicle carries out during acceleration or during deceleration (braking) and whose degree is very largely determined by the magnitude and direction of the respective longitudinal acceleration can be compensated with regard to the headlight range with a high degree of reliability.

One advantage of the present invention resides, inter alia, in the fact that the average ground clearance or the average level of the vehicle does not necessarily have to be determined.

For example, in order to adjust the headlight range in passenger cars it is known to adjust a handle or adjustment wheel on the dashboard as a function of the number of vehicle occupants and the load condition of the trunk to different marks and thus to adjust the headlights appropriately so that a headlight-range setting which is very largely independent of load is achieved. By virtue of the present invention, however, the dynamic changes in the level or ground clearance as a result of longitudinal acceleration or deceleration of the vehicle are then also automatically compensated.

Insofar as the vehicle is equipped with a ride control system, it is expediently provided for the ride control system to be controlled so that changes in the level or ground clearance which take place as a result of longitudinal acceleration or deceleration of the vehicle are not compensated and the headlight range adjustment system does not have to take into account any interventions by the ride control system during acceleration or deceleration of the vehicle.

For this purpose, for example, the prescribed desired value of the ride control system can be changed, utilizing the signals relating to the longitudinal acceleration or deceleration of the vehicle, such that the ride control system is not triggered when temporary changes in the level or ground clearance occur as a result of longitudinal acceleration or deceleration of the vehicle. To achieve this, in principle the normally prescribed desired value merely has to be changed by a degree which corresponds to the change in level or ground clearance to be expected as a result of the longitudinal acceleration or deceleration.

According to a preferred embodiment of the present invention, if appropriate signals which are generated in the vehicle and which represent the driving speed and/or the inclination of the vehicle can additionally be taken into account.

The driving speed is measured in virtually every vehicle so that appropriate signals are continuously present. As a result of air lifting forces which are speed-dependent, changes which are, however, as a rule comparatively small can occur in the level and ground clearance. These changes can be taken into account by evaluating the speed signals.

An inclination sensor is often present in vehicles in order to be able to control automatic gearboxes appropriately to requirements. If, for example, the gearbox control "knows" that, by virtue of the direction of travel and the inclination, the vehicle is driving uphill, premature changing-up of the gearbox, which would be undesired in this case, can be avoided. The signals of the inclination sensor can also serve to take into account the influence of downgrade forces on the ground clearance or the level of the vehicle.

If, for example, a vehicle is parked on a downward gradient in the forwards direction, the downgrade force acting at the center of gravity of the stationary vehicle produces a moment which leads to a certain degree of spring compression at the front axle and a certain degree of rebound travel at the rear axle. The same forces also occur if the vehicle is driving down a gradient at a constant speed. The aforementioned moment virtually disappears if the vehicle rolls down the incline, without being impeded friction and air resistance.

Because the movement state of the vehicle is continuously registered in the present invention, changes in the level or ground clearance on upward gradients and downward gradients can therefore be determined by the signals of the inclination sensor.

BRIEF DESCRIPTION OF THE DRAWINGS

These and other objects, features and advantages of the present invention will become more readily apparent from the following detailed descriptions when taken in conjunction with the accompanying drawings wherein:

FIG. 1 is a diagram which exemplifies the driving speed v during a driving manoeuvre as a function of time t;

FIG. 2 is an associated diagram which shows the acceleration b of the vehicle in the longitudinal direction of the vehicle as a function of time t during the driving manoeuvre of FIG. 1;

FIG. 3 is a diagram which illustrates the vehicle ground clearance N in the region of the front axle during the driving manoeuvre of FIG. 1.

DETAILED DESCRIPTION OF THE DRAWINGS

Figure 4:
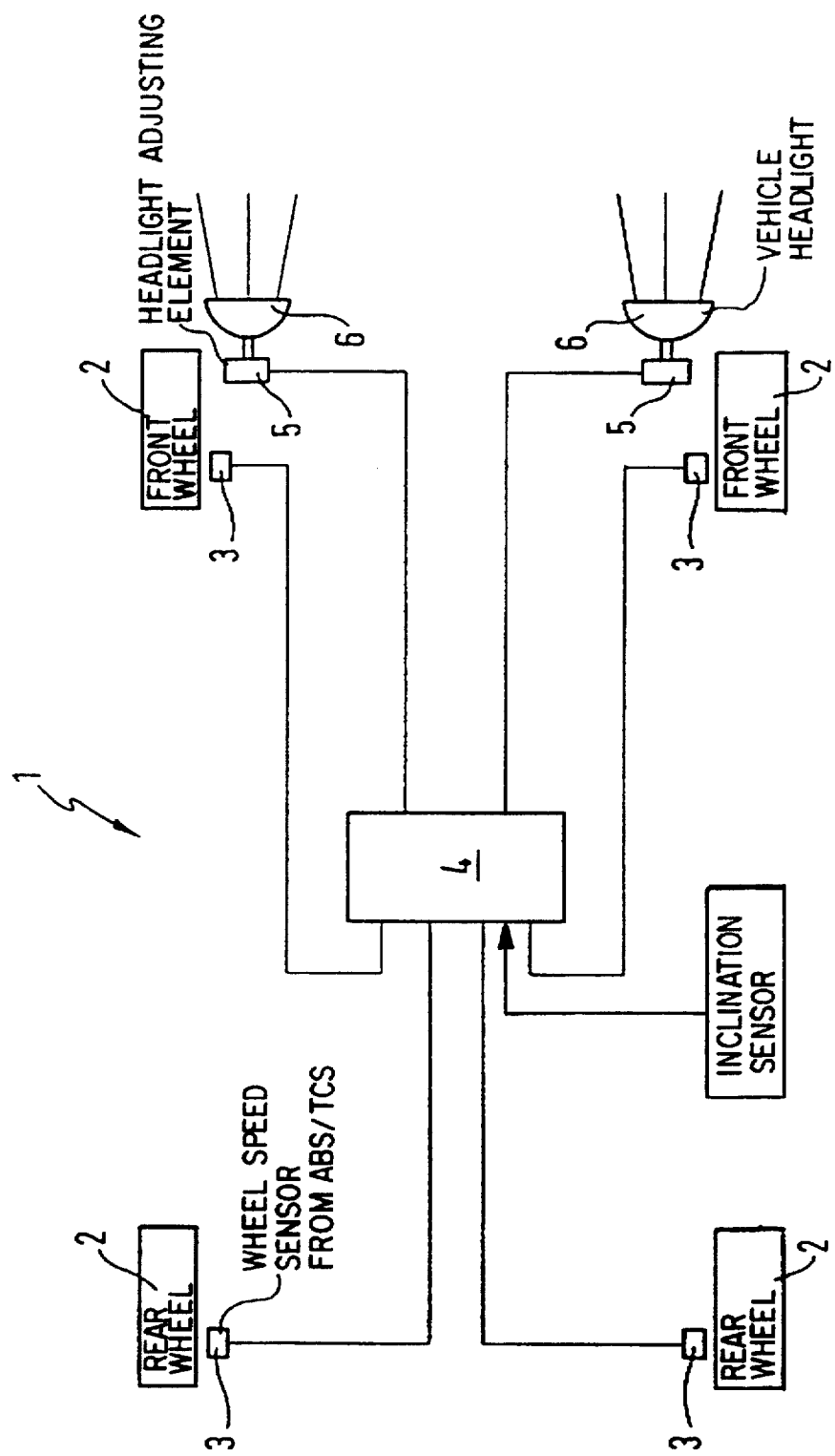
FIG. 4 is a schematic plan view of a vehicle with a device according to the present invention for detecting changes in the level or ground clearance.

The diagram in FIG. 1 illustrates an exemplary driving manoeuvre in which the vehicle travels initially at a speed of approximately 75 km/h, then increases the speed v and reduces it again to the initial value, etc.

The diagram in FIG. 2 shows the longitudinal acceleration b of the vehicle during these manoeuvres. The corresponding values of the acceleration b have been determined from the signals of rotational speed sensors which, for example for an ABS system, are assigned to the wheels of the vehicle. Because the wheel speeds are subject to certain fluctuations which are also caused, among other things, by unevennesses in the surface of the roadway, the values of the acceleration b have a certain fluctuation range or spread which can be compensated by forming mean values.

The diagram in FIG. 3 illustrates the associated measured values of the level or ground clearance of the vehicle in the region of the front axle. The signals of measured value sensors between the body of the vehicle and the front axle are represented graphically in example illustrated.

It is clear that this measurement curve is very largely analogous with the profile of the acceleration b in FIG. 2. Therefore, correspondingly, the change in the ground clearance or the level of the vehicle in the region of the front axle does not necessarily have to be determined by separate measured value sensors which are controlled by movements in the front wheels or the front axle in relation to the body of the vehicle. Instead, the values of the longitudinal acceleration of the vehicle plotted according to FIG. 2 constitute an analogous measure of the changes of the level or ground clearance so that these changes can be determined directly from the measured values of the longitudinal acceleration b. All this merely means mathematically that the values of the longitudinal acceleration b have to be multiplied by a factor, which is, if appropriate, acceleration-dependent and can be determined by road tests.

In the vehicle 1 illustrated diagrammatically in FIG. 4, the wheels 2 are respectively assigned rotational speed sensors 3 whose signals are fed, as is basically known, to a control circuit 4 which is assigned to an ABS or TCS system and which can prevent blocking of the wheels during braking manoeuvres or excessive slip of the driven wheels during acceleration by appropriate activation of the wheel brakes in a known manner and therefore not illustrated.

According to the present invention, by evaluating the wheel speeds, the control circuit 4 additionally makes available signals relating to the vehicle longitudinal acceleration b and thus relating to changes in the level or ground clearance of the vehicle.

Adjustment elements 5, for example, which are drivingly coupled to vehicle headlights 6 can be controlled by these signals. In this manner, it is possible to ensure that the respectively provided range setting of the headlights remains very largely unchanged even when changes in the ground clearance or level of the vehicle occur, in particular when pitching movements of the body of the vehicle occur as a result of longitudinal acceleration.

The present invention also permits travel states to be detected in which the ground clearance of the vehicle does in fact change in the region of an axle but, nevertheless, activation of the adjustment elements 5 in order to change the range setting of the headlights 6 is superfluous. If, for example, a vehicle is driving over a pronounced bump in the ground on an even road at a constant speed, the front axle experiences spring compression first and then the rear axle. If the suspension system of the vehicle is adjusted in an optimum way, the body of the vehicle remains virtually at rest in such cases. That is, the body of the vehicle does not execute any, or at least appreciable, vertical movement in relation to a reference system which is fixed with respect to the roadway. Nevertheless, as the bump is travelled over, level sensors assigned to the axles of the vehicle would temporarily register a reduced distance between the body of the vehicle and the respective axle of the vehicle and thus a change in the ground clearance. Without particular measures, it Would then be possible to activate the adjustment elements 5 of the vehicle headlights 6 in order to change the headlight-range setting. Such a change in the headlight-range setting is, however, undesired because the body of the vehicle has remained vertically at rest.

According to the present invention, the longitudinal acceleration of the vehicle is evaluated, and such an undesired change in the headlight-range setting is readily avoided. In the situation described above in which a bump is travelled over at a constant speed, there is, in fact, no longitudinal acceleration of the vehicle whatsoever so that control of the headlight-range setting involving evaluation of the longitudinal acceleration does not lead to any change in the headlight-range setting, as is desired.

The present invention can also be used to great advantage to reduce the energy requirement of a vehicle ride control system. By virtue of the fact that it is actually instances of vehicle longitudinal acceleration, and thus the essential causes of dynamic changes in the ground clearance or level, which are detected, a control intervention does not occur in the case of such dynamic, and correspondingly only temporary changes. In other words, ride control system does not react to pitching movements of the body of the vehicle, such as occur during acceleration or braking of the vehicle, or only does so with a relatively long delay. Thus, the triggering frequency of the ride control system is significantly reduced, and consequently the energy requirement of the ride control system decreases correspondingly.

For this purpose, when dynamic changes in the level or ground clearance occur, the prescribed desired value for the level or the ground clearance can be changed by technical control apparatus such that no, or virtually no, desired value/actual value deviation occurs and, accordingly, control intervention is not brought about.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A headlight-range adjustment system on a vehicle for automatically adjusting vehicle headlights as a function of vehicle longitudinal acceleration and longitudinal deceleration, comprising at least one wheel speed sensor included in one of an anti-lock brake system and a traction control system to detect rotational wheel speed, means for determining signals representative of the vehicle longitudinal acceleration and deceleration and dynamic changes in at least one of vehicle level, ground clearance and pitching movements of the vehicle from signals representative of the detected rotational wheel speed, and means for controlling adjustment elements drivingly connected to the vehicle headlights to keep the range setting of the vehicle headlights substantially independent of the dynamic changes of the at least one vehicle level, ground clearance and the pitching movements based upon said determined signals.

2. The headlight-range system according to claim 1, wherein the determining means is configured such that changes in the vehicle level or ground clearance brought about by one of the vehicle longitudinal acceleration and deceleration are ignored in vehicle ride control.

3. The headlight-range adjustment system according to claim 1, wherein the determining means includes an inclination sensor such that signals therefrom detect influence downgrade forces on the vehicle level or the ground clearance.

4. The headlight-range adjustment system according to claim 3, wherein the determining means is configured such that changes in the vehicle level or ground clearance brought about by one of the vehicle longitudinal acceleration and deceleration are ignored in vehicle ride control.

5. The headlight-range adjustment system according to claim 1, wherein the determining means is configured to register driving speed of the vehicle to detect changes in the vehicle level or the ground clearance resulting from air resistance.

6. The headlight-range adjustment system according to claim 5, wherein the determining means is configured to process said signals representative of the vehicle longitudinal acceleration and deceleration during vehicle ride control and is further configured to change a desired vehicle level such that changes in the vehicle level or ground clearance brought about by one of the vehicle longitudinal acceleration and deceleration are ignored.

7. The headlight-range adjustment system according to claim 6, wherein the determining means includes an inclination sensor such that signals therefrom detect an influence of downgrade forces on the vehicle level or the ground clearance.

8. A method for adjusting headlight range of a vehicle, comprising the steps of (a) detecting rotational wheel speed from at least one wheel speed sensor included in one of an anti-lock brake system and a traction control system, (b) determining at least one of vehicle longitudinal acceleration and deceleration based on the detected rotational wheel speed, (c) issuing signals representative of dynamic changes in vehicle level, ground clearance or pitching movements of the vehicle in response to the determined vehicle longitudinal acceleration or deceleration, and (d) automatically controlling adjustment of the vehicle headlight range based solely on the determined vehicle longitudinal acceleration or deceleration substantially independently of the dynamic changes in the vehicle.

* * * * *